(12) United States Patent
Jamkhedkar et al.

(10) Patent No.: US 7,600,005 B2
(45) Date of Patent: Oct. 6, 2009

(54) METHOD AND APPARATUS FOR PROVISIONING HETEROGENEOUS OPERATING SYSTEMS ONTO HETEROGENEOUS HARDWARE SYSTEMS

(75) Inventors: Prashant P. Jamkhedkar, Sunnyvale, CA (US); Ravi V. Chitloor, Mountain View, CA (US); Amresh Prasad, Sunnyvale, CA (US); Anand J. Bhalerao, Santa Clara, CA (US); Pierre Couture, San Francisco, CA (US); Ushasree Kode, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 563 days.

(21) Appl. No.: 11/286,992

(22) Filed: Nov. 23, 2005

(65) Prior Publication Data
US 2007/0118654 A1    May 24, 2007

(51) Int. Cl.
*G06F 15/177* (2006.01)

(52) U.S. Cl. .................. 709/220; 709/221; 717/168; 717/170; 717/171; 717/174

(58) Field of Classification Search ................ 709/220, 709/221; 717/168, 170, 171, 174
See application file for complete search history.

(56) References Cited

U.S. PATENT DOCUMENTS

| | | | |
|---|---|---|---|
| 7,107,330 B1 * | 9/2006 | Hamilton et al. | 709/221 |
| 7,272,730 B1 * | 9/2007 | Acquaviva et al. | 713/300 |
| 2006/0190238 A1 * | 8/2006 | Autor et al. | 703/25 |
| 2006/0294515 A1 * | 12/2006 | Gimpl et al. | 717/174 |

* cited by examiner

*Primary Examiner*—Yves Dalencourt
(74) *Attorney, Agent, or Firm*—Osha • Liang LLP

(57) ABSTRACT

A method for provisioning a plurality of heterogeneous operating systems on a plurality of target hosts that includes for each of the plurality of target hosts, obtaining a type of operating system (OS) to be provisioned on the target host, populating an OS profile model based on the type of operating system obtained, activating a deployment service based on the type of operating system, and provisioning the target host using a deployment service and the OS profile model.

15 Claims, 8 Drawing Sheets

METHOD AND APPARATUS FOR PROVISIONING HETEROGENEOUS OPERATING SYSTEMS ONTO HETEROGENEOUS HARDWARE SYSTEMS

BACKGROUND

A data center is a facility that physically houses various equipment, such as computers, servers (e.g., web servers, application servers, database servers), switches, routers, data storage devices, load balancers, wire cages or closets, vaults, racks, and related equipment for the purpose of storing, managing, processing, and exchanging data and information between hosts. A host typically corresponds to a computer system, a processor with associated physical memory, or a processor with shared memory and/or resources. Data centers also provide application services and management for various data processing functions, such as web hosting internet, intranet, telecommunication, and information technology.

Data centers are a unique environment because all the machines and services provided to clients are within a controlled and well-monitored environment. Specifically, data centers are managed by one or more administrators. In order to provide the application services and data processing functions, software is installed by an administrator on each host of the data center. Typically, installing the software on each host is performed remotely. Provisioning is the act of installing the software. One type of software that is typically provisioned is the operating system (OS) on bare hardware.

Provisioning an OS in a data center is challenging because data centers are typically large and heterogeneous with respect to different operating systems (e.g., Solaris™ developed by Sun Microsystems, Inc. (a trademark of Sun Microsystems, Inc. located in Santa Clara, Calif.), Redhat Linux® developed by Red Hat, Inc. (a registered trademark of Red Hat, Inc. located in Raleigh, N.C.), SUSE® Linux developed by Novell, Inc. (a registered trademark of Novell, Inc. located in Waltham, Mass.), Windows® developed by Microsoft Corporation (a registered trademark of the Microsoft Corporation located in Redmond, Wash.), etc.) and types of hosts (i.e., different hosts use different hardware).

Further, each OS has a separate provisioning program that orchestrates the provisioning of the OS on the host. Each provisioning program typically has different input parameters, configuration file formats, and configuration steps. Accordingly, provisioning the different types of operating systems requires the administrator to be knowledgeable about the different input parameters, configuration file formats, and configuration steps.

SUMMARY

A system for provisioning a plurality of heterogeneous operating systems on a plurality of target hosts comprising an operating system profile model for maintaining operating system information about a selected operating system (OS) of the plurality of heterogeneous operating systems, a plurality of pluggable hardware services accessing the operating system profile model and configured to for a target host of the plurality of target hosts, determine the selected OS of the plurality of heterogeneous operating systems, activate a deployment service associated with the selected OS, and provision the selected OS of the plurality of heterogeneous operating systems on the target host using the OS profile model and the deployment service.

A method for provisioning a plurality of heterogeneous operating systems on a plurality of target hosts comprising for each of the plurality of target hosts, obtaining a type of operating system (OS) to be provisioned on the target host, populating an OS profile model based on the type of operating system obtained, activating a deployment service based on the type of operating system, and provisioning the target host using a deployment service and the OS profile model.

A data center for provisioning a plurality of heterogeneous operating systems on a plurality of target hosts comprising a server executing an OS provisioning framework configured to for each of the plurality of target hosts, obtain a type of operating system (OS) to be provisioned on the target host, populating an OS profile model based on the type of operating system obtained, activate a deployment service based on the type of operating system, and provision the target host using a deployment service, the OS profile model, and code for the OS, and a boot and install server connected to the server executing an OS provisioning framework configured to store the code for the OS for the target host.

Other aspects and advantages of the invention will be apparent from the following description and the appended claims.

DETAILED DESCRIPTION

Figure 1:
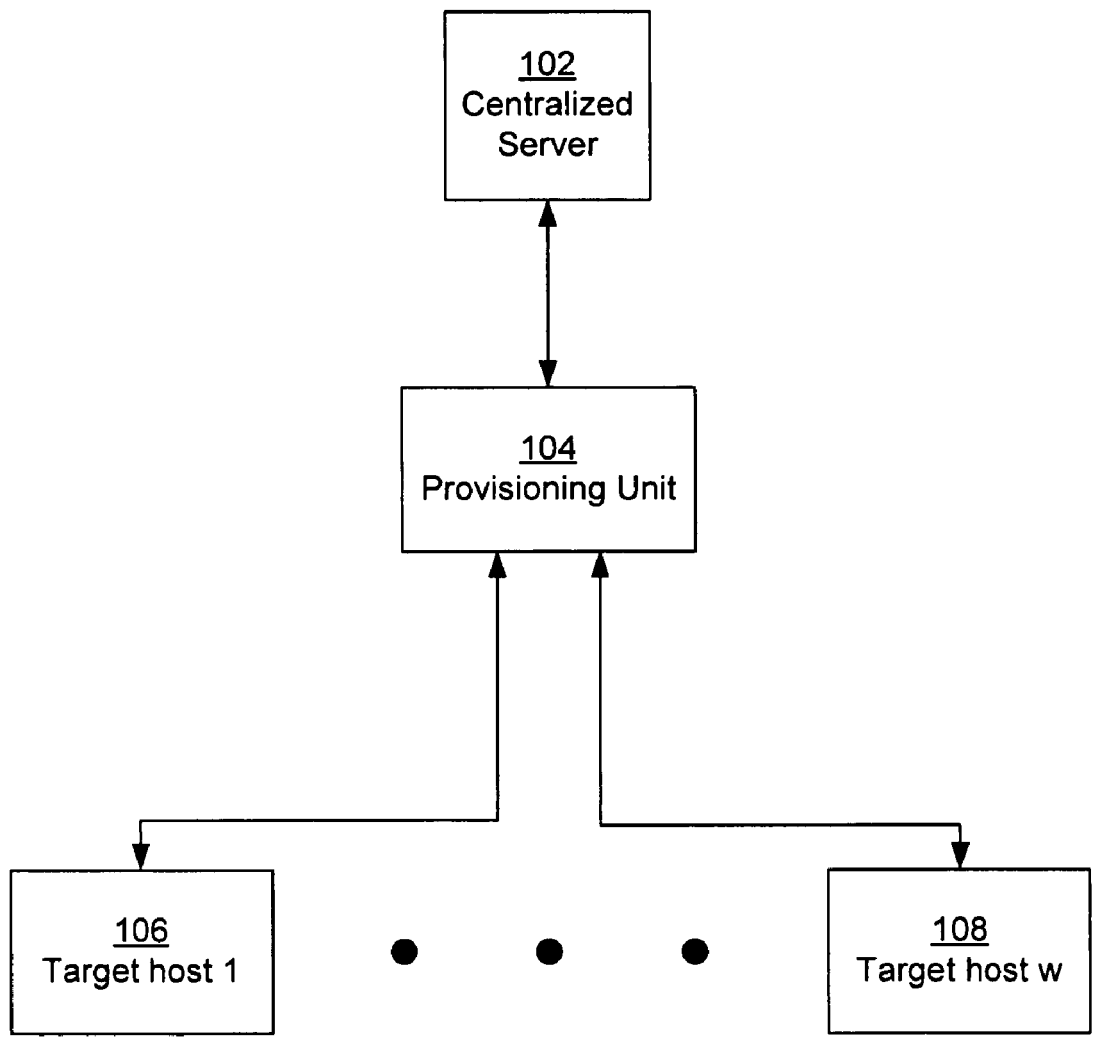
FIG. 1 shows a schematic diagram of a system for provisioning heterogeneous operating systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a unified method and apparatus for provisioning heterogeneous operating systems on heterogeneous hardware. Specifically, embodiments provide a single resource for an administrator to provision multiple types of operating systems across a data center. More specifically, embodiments of the invention provide an abstraction for OS provisioning.

FIG. 1 shows a schematic diagram of system for provisioning heterogeneous operating systems in accordance with one or more embodiments of the invention. As shown in FIG. 1, the system includes a centralized server (102), a provisioning unit (104), and multiple target hosts (e.g., target host 1 (106), target host w (108)). Each of the aforementioned components is described in more detail below.

The centralized server (102), in one or more embodiments of the invention, corresponds to a unit for providing an interface to the administrator (not shown). The centralized server (102) may correspond to a web server that includes such functionality as the ability to issue web pages or web applications to the administrator, an application executing on the computer of the administrator, or any other functionality which provides an interface to the system. The interface may be a command line interface or a graphical user interface.

Connected to the centralized server (102) is a provisioning unit (104). In one or more embodiments of the invention, the provisioning unit (104) corresponds to a component that includes functionality to manage the provisioning of the target hosts (e.g., target host 1 (106), target host w (108)). In one or more embodiments of the invention, the provisioning unit corresponds to one or more servers connected to the target hosts (e.g., target host 1 (106), target host w (108)). The provisioning unit (104) is described in more detail below (in FIG. 2).

The target hosts (e.g., target host 1 (106), target host w (108)) corresponds to a group of computers on which the provisioning may be performed. Typically, multiple different operating systems are provisioned on the target hosts (e.g., target host 1 (106), target host w (108)). For example, one group of target hosts (e.g., target host 1 (106), target host w (108)) may execute Solaris™, while another group may execute Windows®. Accordingly, target host 1 (106) may not execute the same OS as target host w (108). Further, groups of target hosts (e.g., target host 1 (106), target host w (108)) that execute the same OS may or may not use the same configuration settings.

In one or more embodiments of the invention, target hosts (e.g., target host 1 (106), target host w (108)), may be composed of heterogeneous hardware systems. For example, target 1 (106) may correspond to a target managed through Sun Microsystems, Inc. Intelligent Platform Management Interface (IPMI) and target host w (108) may correspond to a target managed through Hewlett-Packard® Integrated Light Out Management (ILO), etc. Alternatively, the target host (e.g., target host 1 (106), target host w (108)) may be of a generic type in which the hardware is individually specified by an administrator (not shown).

Those skilled in the art will appreciate that the target hosts (e.g., target host 1 (106), target host w (108)), provisioning unit (104), and centralized server (102) may be connected in virtually any manner. Further, in one or more embodiments of the invention, the provisioning unit (104) and the target hosts (e.g., target host 1 (106), target host w (108)) are typically behind a firewall. The centralized server (102) may or may not be behind the same firewall as the provisioning unit (104) and the target hosts (e.g., target host 1 (106), target host w (108)). Typically, the provisioning unit (104) is maintained with or without the centralized server (102) at a data center that maintains the target hosts (e.g., target host 1 (106), target host w (108)).

Figure 2:
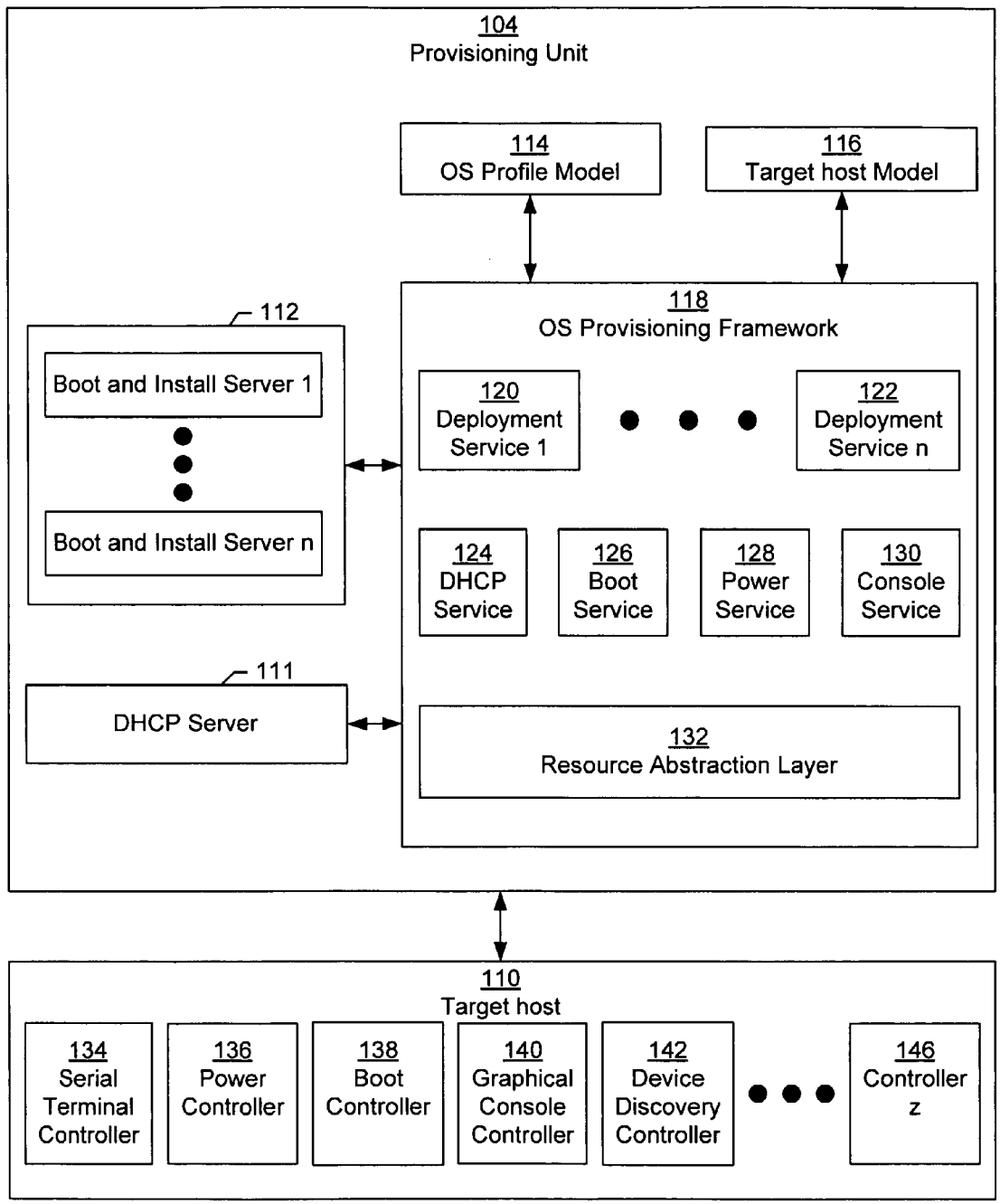
FIG. 2 shows a schematic diagram of a provisioning unit and target host for provisioning heterogeneous operating systems in accordance with one or more embodiments of the invention.

FIG. 2 shows a schematic diagram of a provisioning unit (104) and target host (110) for provisioning heterogeneous operating systems in accordance with one or more embodiments of the invention. Specifically, the target host (110) corresponds to any one of the target hosts (e.g., target host 1 (106), target host w (108)) of FIG. 1. In one or more embodiments of the invention, the target host (110) includes multiple controllers (e.g., serial terminal controller (134), power controller (136), boot controller (138), graphical console controller (140), device discovery controller (142), controller z (146)). In one or more embodiments of the invention, a controller (e.g., serial terminal controller (134), power controller (136), boot controller (138), graphical console controller (140), device discovery controller (142), controller z (146)) corresponds to a device which provides for remote management of the target host (110).

Specifically, the serial terminal controller (134) includes functionality to allow for remote viewing of the output of a serial terminal. The power controller (136) includes functionality for turning on and off the host. The boot controller (138) includes the functionality to allow for remote loading of programs. The graphical console controller (140) includes functionality to allow for remote viewing of a graphical console. The device discovery controller (142) includes functionality to allow for remote adding and configuring new devices on the target host (110).

Those skilled in the art will appreciate that there are multiple types of controllers (e.g., serial terminal controller (134), power controller (136), boot controller (138), graphical console controller (140), device discovery controller (142), controller z (146)) of which only a few are shown in FIG. 2. Further, one or more of the aforementioned functionalities provided by the different controllers (e.g., serial terminal controller (134), power controller (136), boot controller (138), graphical console controller (140), device discovery controller (142), controller z (146)) may be performed by a single controller. For example, the Automatic Light Out Management (ALOM) controller developed by Sun Microsystems, Inc. performs the functions of the power controller (136), boot controller (138), and serial terminal controller (134).

Continuing with FIG. 2, the provisioning unit (104) includes boot and install servers (112), an OS profile model (114), a target host model (116), and an OS provisioning framework (118). Each of the aforementioned components is described in more detail below.

In one or more embodiments of the invention, the boot and install servers (112) correspond to the servers which have the packages for the operating systems and allow for remote installation of a particular OS. Specifically, the boot and install servers (112) correspond to servers that contain the images for the operating system, which include packages and files from which the operating system on the host is constructed. For example, the boot and install servers (112) may correspond to a Solaris™ JumpStart™, Red Hat® Kick-Start®, Windows® Remote Installation Services (RIS), Hewlet Packard Unix, or other similar boot and install servers. In one or more embodiments of the invention, the packages may be obtained from the manufacturer of the OS.

Continuing with FIG. 2, the OS profile model (114) corresponds to an abstract model for the OS. Specifically, in one or more embodiments of the invention, the OS profile model (114) describes the OS and the OS configuration required on the target host (110). More specifically, the OS profile model includes the meta-data for the configuration parameters for each of the OS profiles.

The target host model (116) corresponds to an abstract model for the target host. Specifically, in one or more embodiments of the invention, the target host model (116) captures the capability of the target host (110), such as the MAC address, IP address, remote network management capabilities, supported protocol information, etc.

In one or more embodiments of the invention, connected to the target host model (116), the OS profile model (114), and the boot and install servers (112) is an OS provisioning framework (118). In one or more embodiments of the invention, the OS provisioning framework (118) allows for a single user interface to provision multiple heterogeneous operating systems. Those skilled in the art will appreciate that the OS provisioning framework may execute on the same server as any of the boot and install servers, or on different servers. The OS provisioning framework includes a deployment service (e.g., deployment service 1 (120), deployment service n (122)), a pluggable network and hardware service (e.g., Dynamic Host Configuration Protocol (DHCP) service (124), boot service (126), power service (128), console service (130)), and a resource abstraction layer (132) in accordance with one or more embodiments of the invention. Each of the aforementioned components is described below.

In one or more embodiments of the invention, the deployment service (e.g., deployment service 1 (120), deployment service n (122)) includes functionality to orchestrate the provisioning of a particular OS. Specifically, in one or more embodiments of the invention, the deployment service (e.g., deployment service 1 (120), deployment service n (122)) allow for the same basic steps to be used when provisioning each type of OS. Further, deployment service 1 (120) may correspond to a service for provisioning Solaris™, whereas deployment service n (122) may correspond to a service for provisioning Linux®. In one or more embodiments of the invention, the deployment service (e.g., deployment service 1 (120), deployment service n (122)) are based on a well-defined application programming interface (API). The API may be invoked from a Command Line Interface (CLI) or other such software entities. By using a well-defined API, the OS provisioning framework (118) is easily extendable and modifiable through additions and modifications to the pluggable deployments services.

Continuing with the OS provisioning framework of FIG. 2, the pluggable hardware services (e.g., DHCP service (124), boot service (126), power service (128), console service (130)) interact with the OS profile model (114) and the target host model to provide a hardware abstraction to the deployment service (e.g., deployment service 1 (120), deployment service n (122)). Specifically, in one or more embodiments of the invention, the pluggable hardware services (e.g., DHCP service (124), boot service (126), power service (128), console service (130)) may be accessed by the API used by the deployment service (e.g., deployment service 1 (120), deployment service n (122)). Each of the services is described in more detail below.

In one or more embodiments of the invention, the DHCP Service (124) includes functionality to provide a communication link between the target host (110) and the OS provisioning framework (118). In one or more embodiments of the invention, the DHCP service interacts with a DHCP server (111). Specifically, the DHCP service describes the minimal DHCP requirements for provisioning using the various DHCP configurations required for different operating systems. The DHCP server (111) includes functionality to serve the target host with an IP address for the target host.

Continuing with FIG. 2, the boot service (126), power service (128), and console service (130) include functionality to use the information stored in the target host model (116) to provide various services to the deployment service (e.g., deployment service 1 (120), deployment service n (122)). The boot service (126) includes functionality to control how the target host (110) boots (e.g., from a local disk, storage area network (SAN) disk, network, etc.). The power service (128) includes functionality to manage the power status of the target host (110). The console service (130) includes functionality to obtain the console output from the target host (110).

Those skilled in the art will appreciate that because the pluggable hardware services (e.g., DHCP service (124), boot service (126), power service (128), console service (130)) are pluggable, the pluggable hardware services (e.g., DHCP service (124), boot service (126), power service (128), console service (130)) may be modified and extended without interrupting the OS provisioning framework (118).

Continuing with FIG. 2, the OS provisioning framework (118) also includes a resource abstraction layer (132). The resource abstraction layer (118) includes functionality to support heterogeneous target hosts (110). Specifically, in one or more embodiments of the invention, the resource abstraction layer (118) includes functionality to support standard network management protocols and provide APIs that may be used to support the pluggable hardware services (e.g., DHCP service (124), boot service (126), power service (128), console service (130)). Further, in one or more embodiments of the invention, the resource abstraction layer (132) may be extended to support new hardware (i.e., target host (110)) with new protocols.

Figure 3:
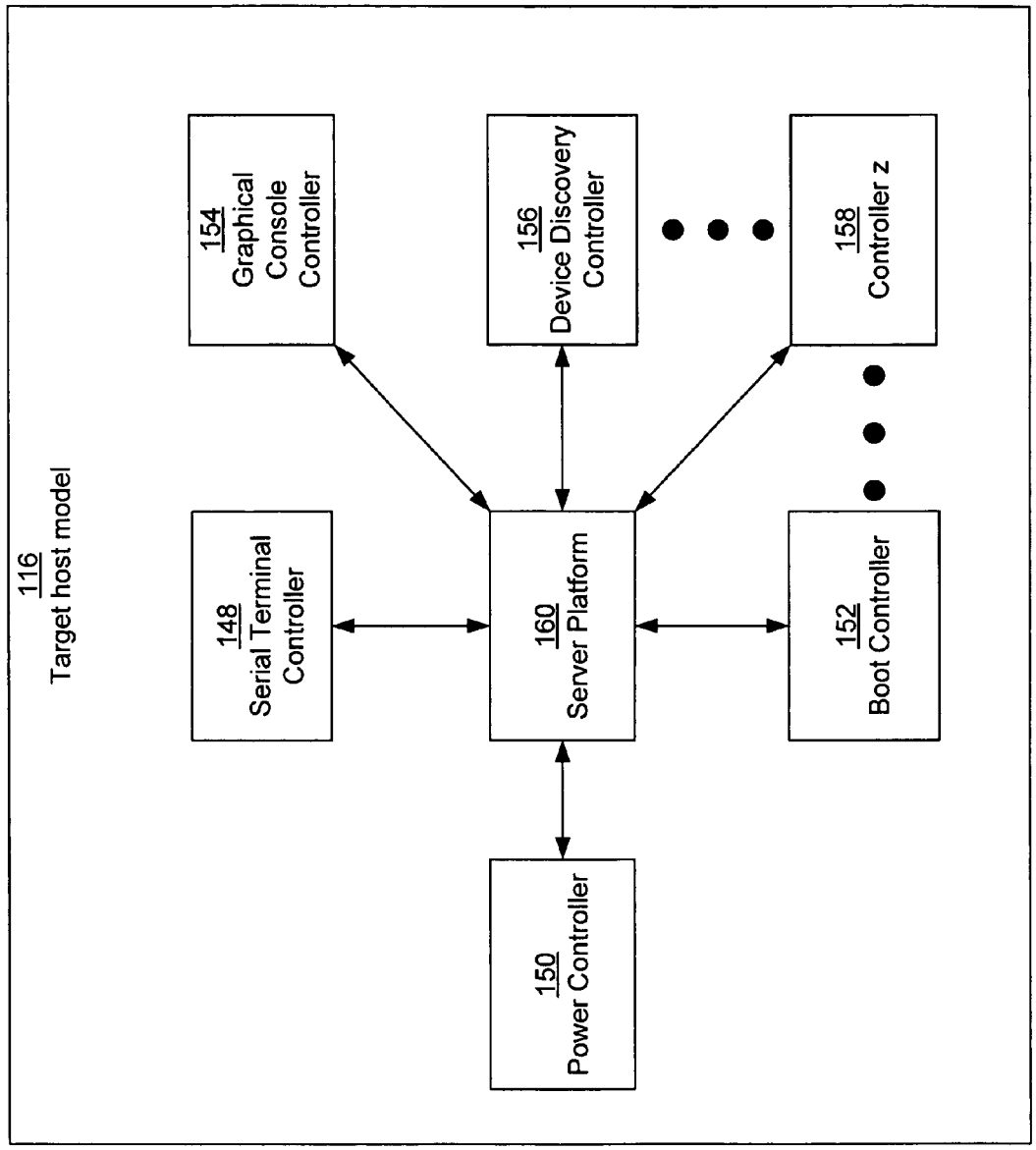
FIG. 3 shows a schematic diagram of a target host model for provisioning heterogeneous operating systems in accordance with one or more embodiments of the invention.

FIG. 3 shows a schematic diagram of a target host model (116) for provisioning heterogeneous operating systems in accordance with one or more embodiments of the invention. In one or more embodiments of the invention, the target host model (116) captures the capabilities of the target host. The target host model includes a model of the server platform (160) and a model of one or more controllers (i.e., the serial terminal controller (148), the power controller (150), the boot controller (152), the graphical console controller (154), the device discovery controller (156), controller z (158)).

In one or more embodiments of the invention, as shown in FIG. 3, the model of the server platform (160) includes information for OS provisioning activities, such as the architecture, MAC address, globally unique identifier (GUID), disk size, disk controller, etc. The model of the controllers (i.e., the serial terminal controller (148), the power controller (150), the boot controller (152), the graphical console controller (154), the device discovery controller (156), controller z (158)), correspond to information about the controllers (e.g., serial terminal controller (134), power controller (136), boot controller (138), graphical console controller (140), device discovery controller (142), controller z (146)) of FIG. 2. Specifically, in one or more embodiments of the invention, the model of the controller includes metadata information for using the controllers. For example, the information may include connectivity information, such as whether connection is through serial access or IP-based access (e.g., telnet, SSH (secure shell protocol), SNMP (simple network management protocol), HTTPS (hypertext transfer protocol secure)), authentication set information (e.g., user name, password), protocol, version number, port number, etc. Those skilled in the art will appreciate that because only the power and boot controllers are required for provisioning, the model may or may not include all of the controllers of the target host, in accordance with one or more embodiments of the invention.

Figure 4:
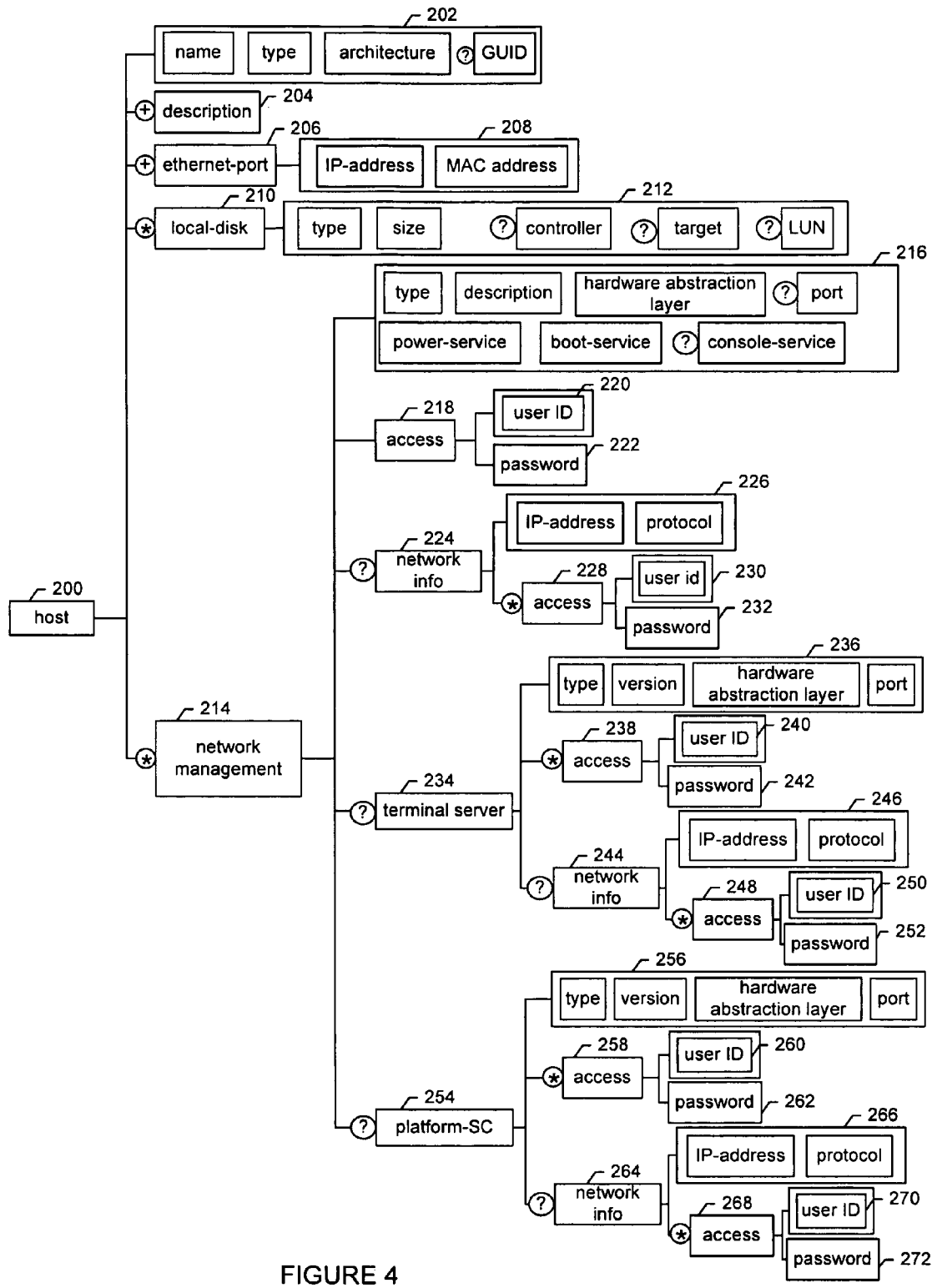
FIG. 4 shows a schematic diagram of an information model representation of a target host model for provisioning heterogeneous operating systems in accordance with one or more embodiments of the invention.

Further, those skilled in the art will appreciate that there are multiple ways to model the target host model. For example, the model shown in FIG. 3 may be represented by an information model shown in FIG. 4. Specifically, FIG. 4 shows a schematic diagram of an information model representation of a target host model for provisioning heterogeneous operating systems in accordance with one or more embodiments of the invention. In one or more embodiments of the invention, the target host model shown in FIG. 4 includes information about attributes (denoted by the double box) and tags.

Figure 5:
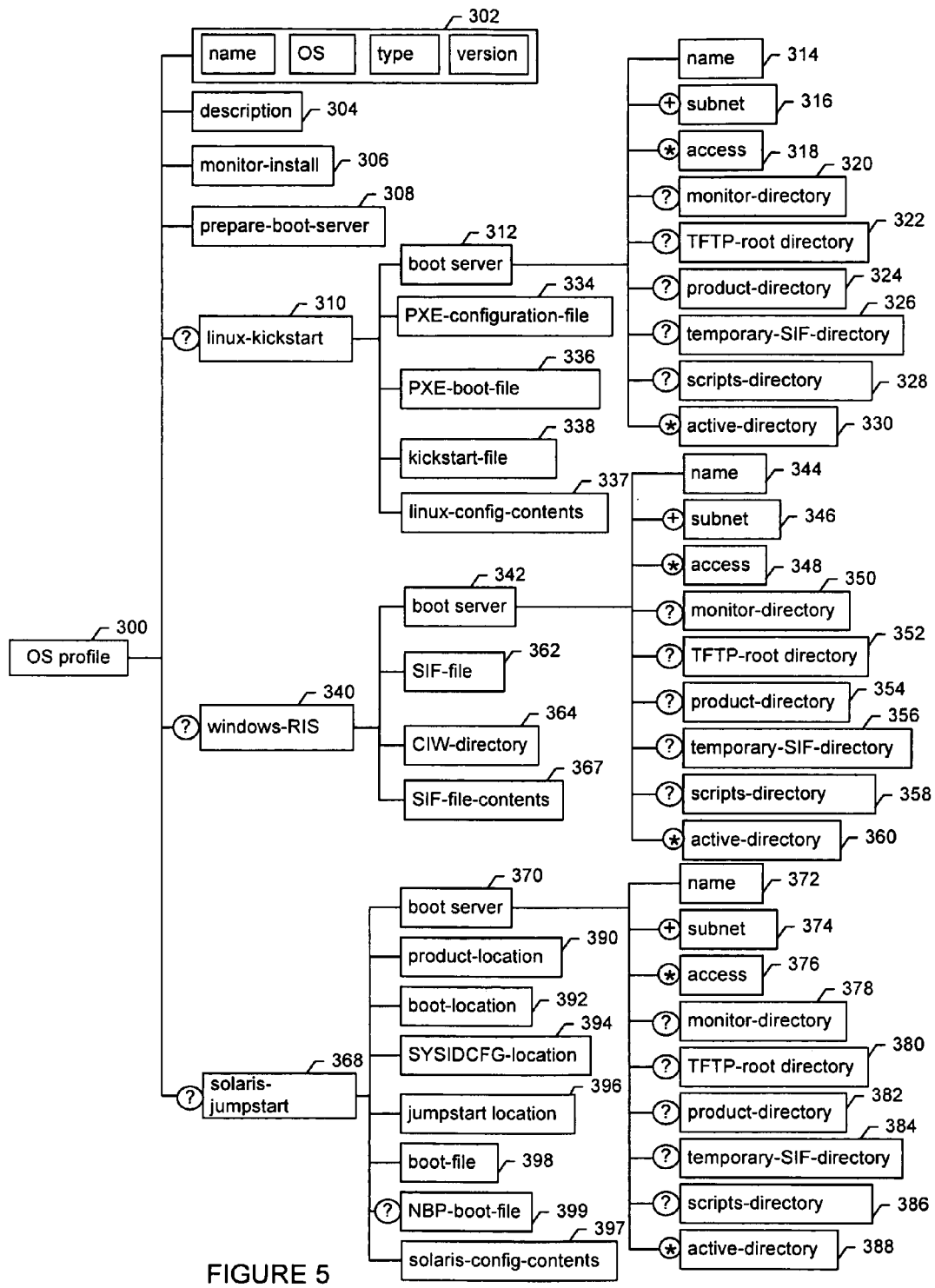
FIG. 5 shows a schematic diagram of an operating system profile model for provisioning heterogeneous operating systems in accordance with one or more embodiments of the invention.

Further, as shown in FIG. 4 and FIG. 5, one or more embodiments of the invention may use information symbols, such as '?', '+', '*', etc. In the information model shown, each symbol refers to the component(s) represented by the subtree and/or attributes directly to the right of the symbol. Each symbol is described below.

A '?' indicates that the component is optional, but not repeatable. Specifically, the component may exist only once, if at all. A '+' indicates that the component represented by the subtree must appear one or more times. A '*' indicates that the component represented by the subtree may exist any number of times.

Returning to FIG. 4, the host model may include information about the host (200), such as attributes (202) defining the host (e.g., a name of the host, the type of host, the architecture, and a globally unique identifier (GUID)), a description (204), information about the Ethernet ports (206) with an IP-address and/or MAC-address of the Ethernet port, local-disk information (210) with attributes (212) about the local disk (e.g., type of disk, size of disk, disk controller information, a name for a group of physical storage devices associated with the local disk (target), Logical Unit Number (LUN), etc.), and information regarding network management (214).

In one or more embodiments of the invention, the information about the network management (214) may include attributes (216) describing the network management (e.g., interface type of network management, a description, hardware abstraction layer, port, and whether the network management interface provides power service, boot-service, and/or console-service), information to access (218) the network management interface with user identifier (ID) (220) and password (222), network information (224) to access the network management, terminal server information (234), System Controller (SC) for the platform (i.e., platform-SC) information (254). The network information (224) may include attributes (226) to access the network such as IP-address and protocol information for accessing the network as well as access information (228) with user ID (230) and password (232).

The terminal server information (234) may include attributes (236) describing the terminal server (e.g., type of terminal server, a version of terminal server, a path to the terminal server hardware abstraction layer, port of terminal server, etc.), access parameters (238) for accessing the terminal server, such as user ID (250) and password (252) for the terminal server, and network information (244) (e.g., attributes (246) defining an IP-address and protocol for accessing the network, access (248) parameters, such as user ID (250) and password (252)).

The platform-SC information (254) may include attributes (256) defining the platform SC (e.g., type of platform-SC, a version of platform-SC, a path to the platform-SC hardware abstraction layer, port of platform-SC, etc.), access parameters (258) including a user ID (260) and password (262) for the platform-SC, and network information (264) (e.g., attributes (266) defining an IP-address and protocol for accessing the network, access (268) parameters, such as user ID (270) and password (272)).

In one or more embodiments of the invention, the target host model described in FIG. 4 is fully adaptable. Specifically, components may be added or removed without affecting the remaining components in the target host model.

Using the same symbols as FIG. 4, FIG. 5 shows a schematic diagram of an OS profile model for provisioning heterogeneous operating systems in accordance with one or more embodiments of the invention. As shown in FIG. 5, the OS profile model may include attributes (302) of the OS (e.g., a name for the OS profile model, the OS, the type of provisioning software specific to the OS, and a version number), a description (304) of the model, indication whether the provisioning should be monitored (308), whether the boot server should be prepared (308), and specific components for the OS provisioning from a Redhat Linux® KickStart® boot server (310), a Windows® RIS server (340), a Solaris™ JumpStart™ server (368), or a SUSE® Linux AutoYast boot server (not shown).

Each of the OS specific components may include information about the specific boot server (e.g., boot server (312), boot server (342), boot server (370)), such as the name (e.g., name (314), name (344), name (372)) of the boot server, the subnet (e.g., subnet (316), subnet (346), subnet (374)) for the boot server, access parameters (e.g., protocol, user ID, password, etc.) (e.g., access (318), access (348), and access (376)) for accessing the boot server. Further, the information specific to the boot server may also include directory information, such as the directory to monitor (e.g., monitor-directory (320), monitor-directory (350), monitor-directory (378)), the root directory used by the trivial file transfer protocol (TFTP) server (e.g., TFTP-root directory (322), TFTP-root directory (352), TFTP-root directory (380)), the directory that has the OS for distribution (e.g., product-directory (324), product-directory (354), product-directory (382)), path of temporary standard input format (SIF) directory (e.g., temporary-SIF-directory (326), temporary-SIF-directory (356), temporary-SIF-directory (384)), path of the boot and install server configuration scripts directory (e.g., scripts-directory (328), scripts-directory (358), scripts-directory (386)), and an active directory (e.g., active directory (330), active directory (360), active directory (388)).

Further, in one or more embodiments of the invention, each OS may be further specified by other components. For example, the Redhat Linux® KickStart® (310) may also include information about the pre-boot execution environment (PXE) configuration file location (i.e., PXE-configuration-file (334)), a PXE-boot-file location (336), and a kickstart file location (338). The Windows® RIS (340) may include information about the location of the software information file location (362), and the location of the client installation wizard (CIW) directory (364). The Solaris™ JumpStart™ server may include information about the product location (390), the boot media location (392), the Solaris™ JumpStart™ configuration file (SYSIDCFG) directory location (394), the Solaris™ JumpStart™ directory location (396), the Solaris™ boot file location (398), and the Solaris™ network bootstrap program (nbp) boot file location (399). Further, each OS may further include the OS install time configuration values. For example, solaris-config-contents (397), linux-config-contents (337), and SIF-file-contents (367) specify the OS install time configuration values for Solaris™, Linux®, and Windows® OS installation. The OS install time configuration values may include information such as password, timezone, locale, disk information, file system information, network information (such as NIS, DNS) and other install time information. Those skilled in the art will appreciate that the OS install time information varies with each type of OS being installed.

In one or more embodiments of the invention, the OS model is easily extendable to allow for provisioning operating systems not specified in FIG. 5 by plugging in the different attributes and tags associated with virtually any OS.

Figure 6:
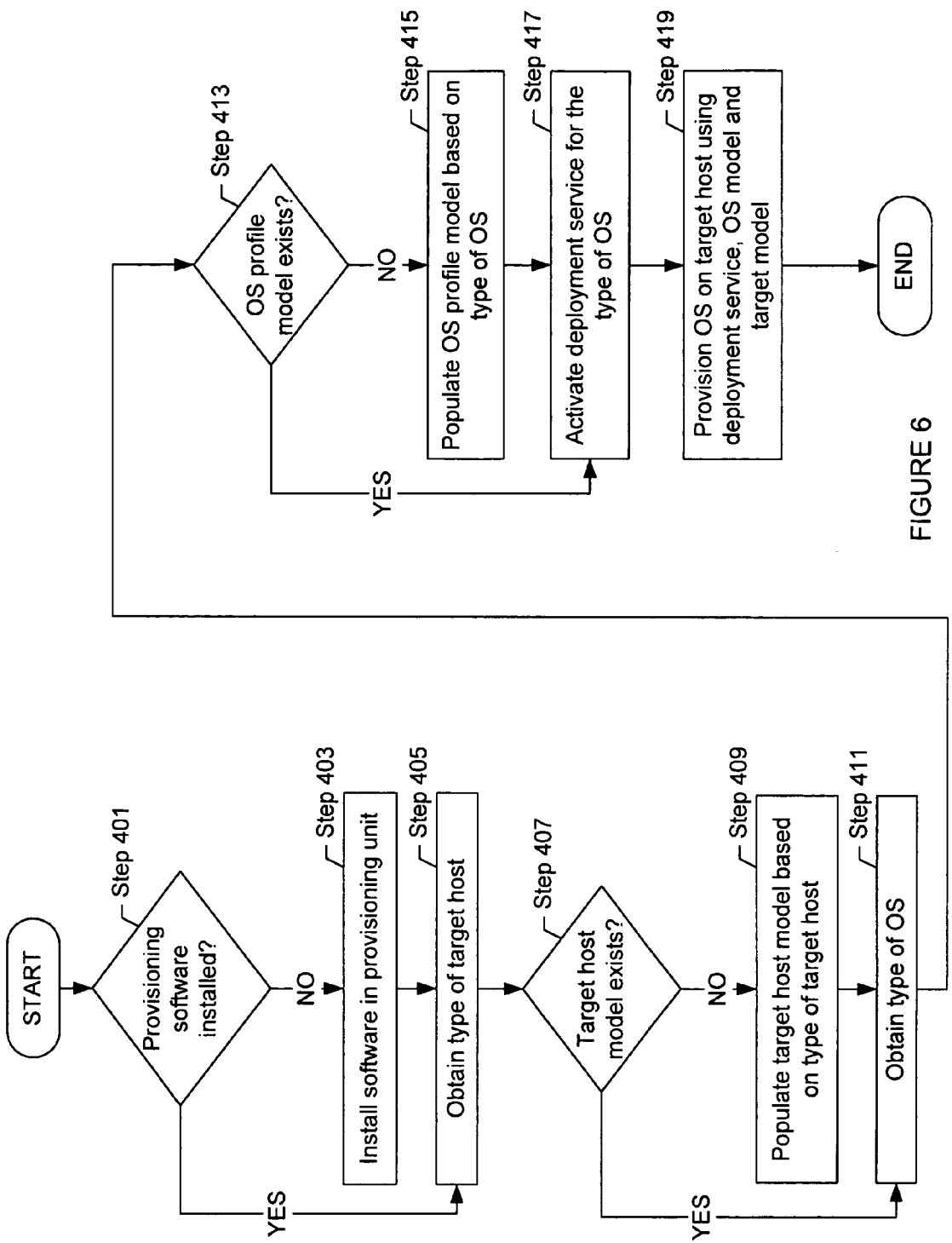
FIG. 6 shows a flowchart of a method for provisioning of heterogeneous operating systems in accordance with one or more embodiments of the invention.

FIG. 6 shows a flowchart of a method for provisioning of heterogeneous operating systems in accordance with one or more embodiments of the invention. Initially, a determination is made whether the provisioning software is installed (Step 401). If the provisioning software is not installed, then the provisioning software is installed on the provisioning unit (Step 403). Specifically, the provisioning software may be installed on each of the boot and install servers as well as on the server with the provisioning framework. After the provisioning software is installed, then the type of target host is obtained (Step 405). Those skilled in the art will appreciate that the type of target host may be specified by an administrator or detected by the server. Next, a determination is made as to whether a target model exists for the type of target (Step 407). Specifically, a user may specify a target host model to use, the system may detect the target host model and determine whether the target host model describes the host to be provisioned, the system requesting the user specify a target host model to use from a listing of target host models, the user or system may determine that the target host model for the host does not exist, etc.

If a target model does not exist for the type of target, then the target model is created and populated based on the type of target (Step 409). In one or more embodiments of the invention, the target model is populated by an administrator accessing a user interface (UI) (graphical or command line). Once the target model exists and is populated, then the type of OS is obtained (Step 411). In one or more embodiments of the invention, the type of OS may also be specified by an administrator accessing the UI.

Next, in one or more embodiments of the invention, a determination is made as to whether an OS model exists for the type of OS (Step 413). The determination of whether the OS model exists for the type of OS may be determined in a similar manner to determining whether the target host model exists. If the OS model does not exist, then the OS model is created and populated based on the type of OS (Step 415). Once the OS model exists, then the deployment service for the type of OS is activated (Step 417). Specifically, the deployment service is initiated and configured to provision the OS. Accordingly, the OS is provisioned on the target host using the deployment service, the OS model, and the target host model (Step 419).

Those skilled in the art will appreciate that multiple target hosts may be provisioned simultaneously. Specifically, a user may initially specify several target hosts to provision. Accordingly, in one or more embodiments of the invention, the framework may provision the multiple target hosts concurrently. Alternatively, the multiple target hosts may be specified by the user sequentially and provisioned sequentially.

Figure 7:
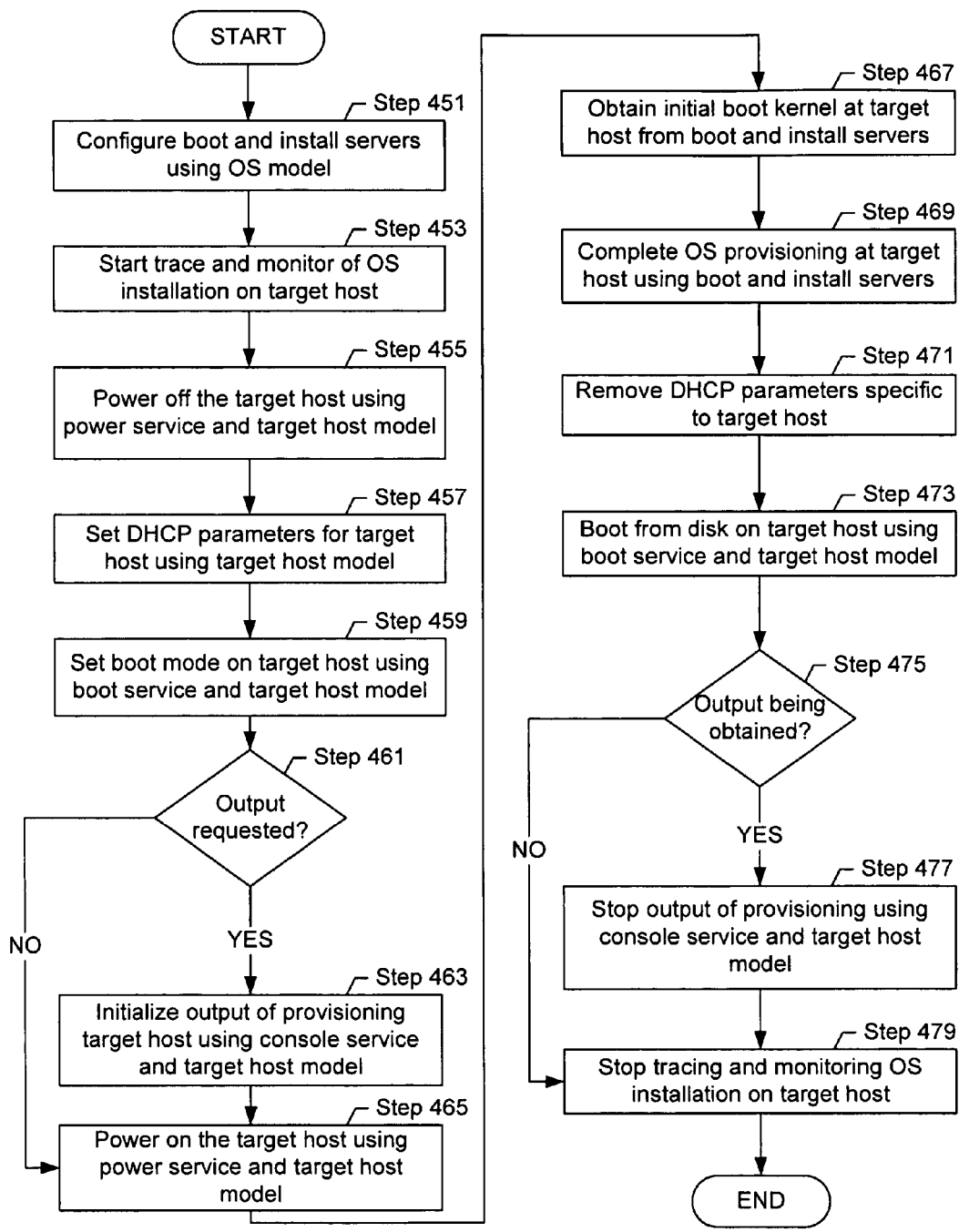
FIG. 7 shows a flowchart of a method for provisioning heterogeneous operating systems in accordance with one or more embodiments of the invention.

FIG. 7 shows a flowchart of a method for provisioning heterogeneous operating systems using the target host model and the OS model in accordance with one or more embodiments of the invention. Specifically, in one or more embodiments of the invention, the steps of FIG. 7 correspond to Step 419 of FIG. 6.

Initially, the boot and install server is configured using the OS model (Step 451). Next, trace and monitor of OS installation on the target host is initialized (Step 453). After initializing the tracing and monitoring of the OS installation, the target host is turned off using the power service and the target host model (Step 455). Specifically, in one or more embodiments of the invention, the power service uses the target host model to determine how to turn off the target host. Next, the DHCP parameters are set on the target host using the target host model (Step 457). Setting the DHCP parameters may include, for example, setting communication parameters and assigning a temporary IP address to the target host. After setting the DHCP parameters, then the boot mode is set on the target host using the boot service (Step 459). In one or more embodiments of the invention, the boot mode is set to boot from the network rather than locally on the host.

Continuing with FIG. 7, a determination is made whether output of the provisioning is requested (Step 461). Specifically, output of the provisioning may be requested by an administrator performing the provisioning. The administrator performing the provisioning may request output to determine whether all of the steps of the provisioning are performed correctly. If output is requested, then the output of the provisioning of the target host is initialized using the information provided in the target host model and the console service (Step 463).

Next, regardless of whether output is requested, the target host is powered on using the target host model and the power service (Step 465). Specifically, similar to powering off the target host, the powering service uses the target host model to determine how to turn on the target host. After powering on the target host, the initial boot kernel is obtained at the target host from the boot and install server (Step 467). In one or more embodiments of the invention, once the boot kernel is obtained at the target host, then provisioning is completed at the target host using the boot and install servers (Step 469). Next, the DHCP parameters specific to the target host are removed from the DHCP service (Step 471). Specifically, the code for the OS for the target host may be transferred to the target host and provisioned on the target host. After completing the OS provisioning, then the target host is booted from disk using the boot service and the target host model (Step 473).

Once the target host is executing after being booted, then a determination is made as to whether output from the target host is being obtained (Step 475). Output from the provisioning may be obtained by accessing the target host model and the console service. If output of the target host is being obtained, then because the provisioning is completed and the host is executing, the output is stopped using the console service and the target host model (Step 477). Finally, regardless of whether output is being obtained, the tracing and the monitoring of the OS installation is stopped on the target host (Step 479). In one or more embodiments of the invention, after stopping the tracing and monitoring of the OS installation, the boot and install servers may be un-configured and the administrator informed of the completion of the provisioning (not shown).

Figure 8:
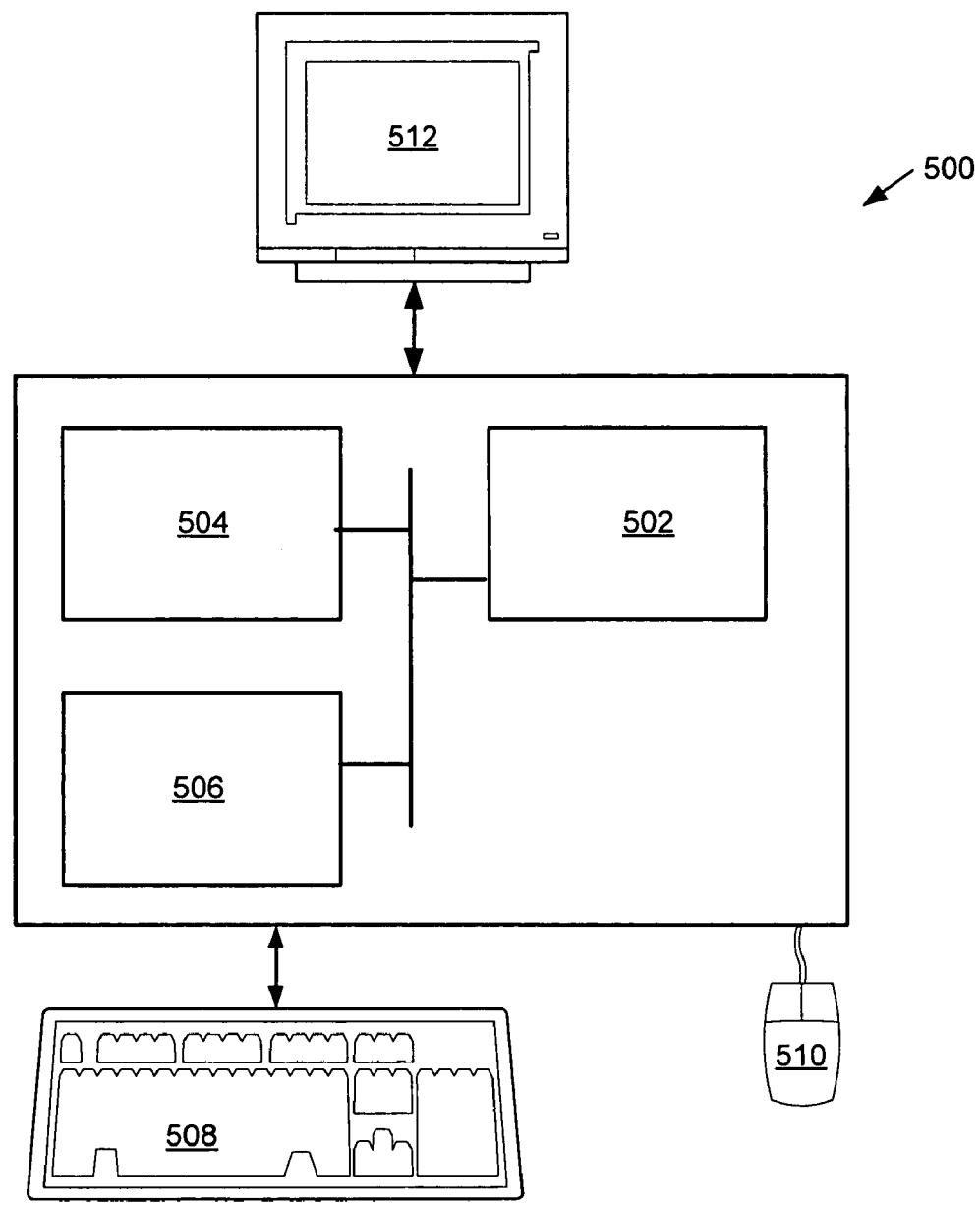
FIG. 8 shows a computer system for provisioning heterogeneous operating systems in accordance with one or more embodiments of the invention.

The invention may be implemented on virtually any type of computer regardless of the platform being used. For example, as shown in FIG. 8, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of hosts, where each portion of the invention (e.g., deployment service, OS profile model, resource abstraction layer, centralized server, etc.) may be located on a different host within the distributed system. In one or more embodiments of the invention, the host corresponds to a computer system. Alternatively, the host may correspond to a processor with associated physical memory. The host may alternatively correspond to a processor with shared memory and/or resources. Further, software instructions to perform embodiments of the invention may be stored on a computer readable medium such as a compact disc (CD), a diskette, a tape, a file, or any other computer readable storage device.

The present invention includes one or more of the following advantages. Specifically, embodiments of the invention provide a uniform model and framework for diverse types of servers and operating systems. More specifically, embodiments of the invention provide a mechanism for allowing a uniform interface for provisioning regardless of the Operating System being used. Further, in one or more embodiments of the invention, the target host model and the OS profile model provide a mechanism for cataloging, versioning and backing up the install time parameters for tracking the OS life cycle allowing for replicating the OS installation (including the configurations) across hundreds of servers, possibly distributed across a LAN or WAN environments. Additionally, by separating the target host model and the OS profile model, the same OS profile can be deployed across different hardware types (if the native OS supports such hardware).

Further, embodiments of the invention provide a push mechanism for installing various operating systems. Specifically, provisioning an OS may be performed at a central location rather than from the target servers. Additionally, embodiments of the invention provide management of full life cycle of OS provisioning by enabling full automation of the power, boot, and console services of a target hosts.

Further, by using pluggable services and easily modifiable models, embodiments of the invention are adaptable to support new operating systems, new hardware, different network topologies, etc. Specifically, embodiments of the invention use a framework that models with a generic workflow to support provisioning of heterogeneous operating systems.

Moreover, because embodiments of the invention separate the models from the provisioning activity, embodiments of the invention are able to provision across an existing data center rather than requiring a new data center environment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for provisioning a plurality of heterogeneous operating systems on a plurality of target hosts comprising:
    a single operating system (OS) profile model for maintaining OS information about a selected OS of the plurality of heterogeneous operating systems;
    a first target host model for maintaining information about a first target host of the plurality of target hosts, wherein the first target host model is separate from the single OS profile model and is OS independent;
    a second target host model for maintaining information about a second target host of the plurality of target hosts, wherein the second target host model is distinct from the first target host model, and wherein the second target host model is separate from the single OS profile model and is OS independent;
    a plurality of pluggable hardware services accessing the single OS profile model and configured to:
        identify the selected OS from the plurality of heterogeneous operating systems for provisioning on the first target host and the second target host;
        activate a deployment service corresponding to the selected OS;
        configure a boot server corresponding to the selected OS to provision the selected OS according to the single OS profile model to create a configured boot server;
        provision the first target host by:
            setting dynamic host configuration protocol (DHCP) parameters on the first target host according to the first target host model;
            loading, on the first target host, an initial boot kernel obtained from the configured boot server using the DHCP parameters on the first target host to obtain an installed operating system on the first target host;
            booting the first target host with the installed operating system on the first target host;
        provision the second target host by:
            setting DHCP parameters on the second target host according to the second target host model;
            loading, on the second target host, the initial boot kernel obtained from the configured boot server using the DHCP parameters on the second target host to obtain an installed operating system on the second target host;
            booting the second target host with the installed operating system on the second target host;
    wherein provisioning the first target host and the second target host uses the same single OS profile model,
    wherein each target host of the plurality of target hosts is a physical computer system in a data center.

2. The system of claim 1, wherein the operating system information comprises name, type, version, and boot-server information.

3. The system of claim 1, wherein the plurality of pluggable hardware services comprises at least one selected from a group consisting of a boot service configured to select a location used to boot the selected OS, and a power service configured to power on the first target host and the second target host.

4. The system of claim 1, wherein the plurality of pluggable hardware services further comprises at least one selected from a group consisting of a DHCP Service configured to provide the first target host with an Internet Protocol (IP) address and a console service configured to obtain console output from the first target host.

5. The system of claim 1, further comprising:
    a resource abstraction layer for providing a set of application programming interfaces to support the first target host using the first target host model.

6. The system of claim 1, wherein the first target host model comprises remote management information for a power controller to power on and off the first target host and a boot controller of the first target host.

7. The system of claim 1, wherein the first target host model comprises remote management information for a device discovery controller, a graphical console controller, and a serial terminal controller.

8. The system of claim 1, wherein the plurality of target hosts comprises heterogeneous hardware systems.

9. A method for provisioning a plurality of heterogeneous operating systems on a plurality of target hosts comprising:
- receiving a selection of an operating system (OS) of the plurality of heterogeneous operating systems to obtain a selected OS;
- obtaining an OS profile model corresponding to the selected OS, wherein the OS profile model maintains OS information about the selected OS;
- activating a deployment service corresponding to the selected OS;
- configuring a boot server corresponding to the selected OS to provision the selected OS according to the OS profile model to create a configured boot server;
- receiving a first target host model for maintaining information about a first target host of the plurality of target hosts, wherein the first target host model is separate from the OS profile model and is OS independent;
- provisioning the first target host by:
    - setting dynamic host configuration protocol (DHCP) parameters on the first target host according to the first target host model;
    - loading, on the first target host, an initial boot kernel obtained from the configured boot server using the DHCP parameters on the first target host to obtain an installed OS on the first target host;
    - booting the first target host with the installed OS on the first target host;
- receiving a second target host model for maintaining information about a second target host of the plurality of target hosts, wherein the second target host model is distinct from the first target host model, and wherein the second target host model is separate from the OS profile model and is OS independent;
- provisioning the second target host by:
    - setting DHCP parameters on the second target host according to the second target host model;
    - loading, on the second target host, the initial boot kernel obtained from the configured boot server using the DHCP parameters on the second target host to obtain an installed OS on the second target host;
    - booting the second target host with the installed OS on the second target host,
- wherein provisioning the first target host and the second target host uses the same OS profile model, and
- wherein each target host of the plurality of target hosts is a physical computer system in a data center.

10. The method of claim 9, wherein provisioning the first target host using the OS profile model further comprises tracing and monitoring the OS installation on the first target host.

11. The method of claim 9, wherein provisioning the first target host further comprises outputting the provisioning from the first target host using a console service.

12. The method of claim 9, wherein the plurality of target hosts comprises heterogeneous hardware systems.

13. The method of claim 9, wherein provisioning the plurality of heterogeneous operating systems on the plurality of target hosts is uniformly performed for all of the plurality of target hosts.

14. The method of claim 9, wherein provisioning the first target host further comprises setting a boot mode on the first target host using the first target host model.

15. A data center for provisioning a plurality of heterogeneous operating systems on a plurality of target hosts comprising:
- a server executing an OS provisioning framework configured to:
    - receive a selection of an operating system (OS) of the plurality of operating systems to obtain a selected OS;
    - obtain an OS profile model corresponding to the selected OS, wherein the OS profile model maintains OS information about the selected OS;
    - activate a deployment service corresponding to the selected OS;
    - configure a boot server corresponding to the selected OS to provision the selected OS according to the OS profile model to create a configured boot server;
    - receive a first target host model for maintaining information about a first target host of the plurality of target hosts, wherein the first target host model is separate from the OS profile model and is OS independent;
    - provision the first target host by:
        - setting dynamic host configuration protocol (DHCP) parameters on the first target host according to the first target host model;
        - loading, on the first target host, an initial boot kernel obtained from the configured boot server using the DHCP parameters on the first target host to obtain an installed OS on the first target host;
        - booting the first target host with the installed OS on the first target host;
    - receive a second target host model for maintaining information about a second target host of the plurality of target hosts, wherein the second target host model is distinct from the first target host model, and wherein the second target host model is separate from the OS profile model and is OS independent;
    - provision the second target host by:
        - setting DHCP parameters on the second target host according to the second target host model;
        - loading, on the second target host, an initial boot kernel obtained from the configured boot server using the DHCP parameters on the second target host to obtain an installed OS on the second target host;
        - boot the second target host with the installed OS on the second target host,
    - wherein provisioning the first target host and the second target host uses the same OS profile model, and
    - wherein each target host of the plurality of target hosts is a physical computer system in a data center; and
- the boot connected to the server executing the OS provisioning framework configured to store code for the selected OS.

* * * * *